US009781134B2

(12) United States Patent
Huang

(10) Patent No.: US 9,781,134 B2
(45) Date of Patent: Oct. 3, 2017

(54) METHOD AND APPARATUS OF IDENTIFYING USER RISK

(71) Applicant: Alibaba Group Holding Limited, Grand Cayman (KY)

(72) Inventor: Mian Huang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/084,379

(22) Filed: Mar. 29, 2016

(65) Prior Publication Data
US 2016/0212152 A1    Jul. 21, 2016

Related U.S. Application Data

(63) Continuation of application No. 13/948,838, filed on Jul. 23, 2013, now abandoned.

(30) Foreign Application Priority Data

Jul. 24, 2012 (CN) .......................... 2012 1 0258816

(51) Int. Cl.
*G06F 17/50* (2006.01)
*H04L 29/06* (2006.01)
*H04L 29/08* (2006.01)
*H04L 12/721* (2013.01)

(52) U.S. Cl.
CPC .......... *H04L 63/14* (2013.01); *H04L 63/0876* (2013.01); *H04L 45/26* (2013.01); *H04L 63/107* (2013.01); *H04L 63/1466* (2013.01); *H04L 67/18* (2013.01)

(58) Field of Classification Search
CPC ....................................................... H04L 45/26
See application file for complete search history.

(56) References Cited

U.S. PATENT DOCUMENTS

| 7,051,367 | B1 | 5/2006 | Krishnaswamy et al. |
| 2005/0021738 | A1 | 1/2005 | Goeller et al. |
| 2005/0097320 | A1 | 5/2005 | Golan et al. |
| 2005/0114702 | A1 | 5/2005 | Klein et al. |

(Continued)

FOREIGN PATENT DOCUMENTS

| JP | 2003345663 | 12/2003 |
| JP | 2008544339 | 12/2008 |

OTHER PUBLICATIONS

Office action for U.S. Appl. No. 13/948,838, dated Dec. 30, 2015, Jeudy et al., "Method and Apparatus of Identifying User Risk", 21 pages.

(Continued)

*Primary Examiner* — Josnel Jeudy
(74) *Attorney, Agent, or Firm* — Lee & Hayes, PLLC

(57) ABSTRACT

Techniques to identify suspicious user logins may include acquiring, by a computing device, a routing path associated with a user login based on login information. The computing device may extract current routing characteristic information from the routing path, and identify whether the current user login is suspicious based on the current routing characteristic information. These techniques reduce the influence of IP address changes on user identification as well as errors associated with user identification, and identify geographic positions more accurately.

15 Claims, 2 Drawing Sheets

(56) References Cited

U.S. PATENT DOCUMENTS

| | | | |
|---|---|---|---|
| 2005/0188222 A1* | 8/2005 | Motsinger | G06F 21/316 |
| | | | 726/5 |
| 2006/0046708 A1 | 3/2006 | Ahrndt | |
| 2006/0095788 A1 | 5/2006 | Bronstein et al. | |
| 2007/0074272 A1 | 3/2007 | Watanabe | |
| 2007/0208934 A1 | 9/2007 | Heffez | |
| 2008/0022004 A1 | 1/2008 | Kim et al. | |
| 2008/0033637 A1* | 2/2008 | Kuhlman | H04L 63/10 |
| | | | 701/533 |
| 2009/0089869 A1 | 4/2009 | Varghese | |
| 2009/0119182 A1 | 5/2009 | Krstulich et al. | |
| 2009/0119742 A1 | 5/2009 | Graziani et al. | |
| 2009/0307744 A1 | 12/2009 | Nanda et al. | |
| 2010/0100951 A1 | 4/2010 | Kutt et al. | |
| 2011/0302641 A1 | 12/2011 | Hald et al. | |
| 2012/0060178 A1 | 3/2012 | Minakuchi et al. | |
| 2013/0173915 A1 | 7/2013 | Haulund | |
| 2014/0033306 A1 | 1/2014 | Huang | |

OTHER PUBLICATIONS

Office Action for U.S. Appl. No. 13/948,838, dated Jul. 2, 2015, Mian Huang, "Method and Apparatus of Identifying User Risk", 20 pages.
Office Action for U.S. Appl. No. 13/948,838, dated Sep. 29, 2014, Mian Huang, "Method and Apparatus of Identifying User Risk", 17 pages.
PCT Search Report and Written Opinion dated Oct. 17, 2013 for PCT application No. PCT/US13/51673, 12 pages.
Translated Japanese Office Action dated May 9, 2017 for Japanese Patent Application No. 2015-524389, a counterpart foreign application for U.S. Appl. No. 13/948,838, 5 pages.

* cited by examiner

METHOD AND APPARATUS OF IDENTIFYING USER RISK

CROSS REFERENCE TO RELATED PATENT APPLICATIONS

This application is a continuation of and claims priority to U.S. patent application Ser. No. 13/948,838, filed on Jul. 23, 2013, entitled "Method and Apparatus of Identifying User Risk", which claims priority to Chinese Patent Application No. 201210258816.5, filed on Jul. 24, 2012, entitled "Method and Apparatus of Identifying User Risk," which applications are hereby incorporated in their entirety by reference.

TECHNICAL FIELD

The present disclosure relates to online security and, more specifically, to identifying risk associate with user identities.

BACKGROUND

Online identity theft has become a serious problem for the Internet services. Online identity theft causes not only monetary losses to users but also harmful consequences to users (e.g., illegal conduct by a third party). Accordingly, service providers desire to find an efficient way to identify a user account at risk (i.e., suspicious user accounts) but also to allow legitimate user activities.

In general, it's difficult for service providers to confirm the credibility of users who currently log in. To accurately identify whether a user account is suspicious, the service providers may determine whether the user account is logged in non-locally. Under traditional technologies, a service provider determines whether a login is a non-local login by selecting a geographic position corresponding to an IP address used when the user logs in.

This techniques, however, has various defects. First, a network operator may change its own IP address pool. For example, IP address allocation among cities may lead to identify a legitimate user as an illegal user. Thus, the identification error rate is relatively high. Second, a geographic position identified by the method of the technique is relatively rough and generally only may be accurate when logins are conducted in different cities. For example, if a third party steals an identity of a user, and logs in in the same city that the user used to log in (e.g., using a proxy server), the risk may not be identified.

Accordingly, an urgent problem needing resolution involves identifying user risk and reducing the influence of an IP address change associated with identification of the user risk. There is also a need to reduce error rates associated with the risk user identification, and identify geographic positions more accurately.

SUMMARY

A technical problem to be solved by embodiments of the present disclosure is to identify user risk and to reduce the influence of an IP address change associated with identification of the user risk. Embodiments of the present disclosure also reduce error rates associated with the risk user identification, and identify geographic positions more accurately.

Embodiments of the present disclosure also relate to methods for identifying that a user login is suspicious. The methods may include acquiring, by a server, a routing path logged in by a user based on login information of the user. Based on the routing path, the server may extract current routing characteristic information from the routing path logged in by the user, and then identify whether the current login is suspicious based on the current routing characteristic information.

In some embodiments, the login information of the user includes a user identity, information of a client terminal where the user initiates a login request and information of a server that receives the login request. The acquiring a routing path logged in by a user based on login information of the user includes sending a routing discovery message to the client terminal by the server, feeding back routing node information hop-by-hop by a router receiving the routing discovery message, and collecting the routing node information by the server to generate a currently logged-in routing path corresponding to the user identity.

In some embodiments, the login information of the user includes information of a client terminal where the user initiates a login request and information of a server that receives the login request. The acquiring a routing path logged in by a user based on login information of the user includes sending a routing discovery message to the server by the client terminal, feeding back routing node information hop-by-hop by a router receiving the routing discovery message, and collecting the routing node information by the client terminal to generate a currently logged-in routing path corresponding to the user identity.

In some embodiments, the extracting current routing characteristic information from the routing path logged in by the user includes extracting information of a key router from the routing path logged in by the user, wherein the information of the key router is information of a router with a traffic greater than a preset threshold, and organizing the information of the key router to form current routing characteristic information.

In some embodiments, the identifying whether the current user logs in non-locally based on the current routing characteristic information includes querying historical routing characteristic information corresponding to the user identity, and comparing whether the historical routing characteristic information and the current routing characteristic information are the same. If the historical routing characteristic information and the current routing characteristic information are not the same, the server may determine that the login is suspicious.

In some embodiments, the login information of the user also includes a machine identity. The identifying whether the current user logs in non-locally based on the current routing characteristic information includes presetting a legal correspondence table of a machine identity and a user class, and determining whether the user identity and the machine identity are present in the legal correspondence table of the machine identity and the user class. In these instances, the user class is a cluster of the user identity with the same path characteristic information. If the user identity and the machine identity are not present, the server may determine that the login is suspicious.

Embodiments of the present disclosure also relate to devices for identifying that a user is suspicious. The device may include a routing path acquisition module, a current path extraction module, and a risk judgment module. The routing path acquisition module is configured to acquire a routing path logged in by a user based on login information of the user. The current path extraction module is configured to extract current routing characteristic information from the routing path logged in by the user. The risk judgment module is configured to identify whether the current login is suspicious based on the current routing characteristic information.

In some embodiments, the login information of the user may include a user identity, information of a client terminal where the user initiates a login request, and information of a server which receives the login request. The routing path acquisition module may include a routing discovery message sending sub-module configured to send a routing discovery message to the client terminal, a collection sub-module configured to collect routing node information fed back hop-by-hop by a router receiving the routing discovery message, and a path generation sub-module configured to generate a currently logged-in routing path corresponding to the user identity.

In some embodiments, the login information of the user may include information of a client terminal where the user initiates a login request and information of a server which receives the login request. The routing path acquisition module may include a routing discovery message sending sub-module configured to send a routing discovery message to the server, a collection sub-module configured to collect routing node information fed back hop-by-hop by a router receiving the routing discovery message, and a path generation sub-module configured to generate a currently logged-in routing path corresponding to the user identity.

In some embodiments, the current path extraction module may include a user login routing path extraction sub-module configured to extract information of a key router from the routing path logged in by the user. In some instances, the information of the key router is information of a router with traffic greater than a preset threshold, and a key router information formation sub-module configured to organize the information of the key router to form current routing characteristic information.

In some embodiments, the risk judgment module may include a user identity query sub-module configured to query historical routing characteristic information corresponding to the user identity, and a routing characteristic information comparison sub-module configured to compare whether the historical routing characteristic information and the current routing characteristic information are the same. If the historical routing characteristic information and the current routing characteristic information are not the same, the server may determine that the login is suspicious.

In some embodiments, the login information of the user may also include a machine identity. The risk judgment module may include a user identity clustering sub-module configured to preset a legal correspondence table of a machine identity and a user class, wherein the user class is a cluster of the user identity with the same path characteristic information, and a user identity and machine identity judgment sub-module configured to determine whether the user identity and the machine identity are present in the legal correspondence table of the machine identity and the user class. If the user identity and the machine identity are not present, the server may determine that the login is suspicious.

Compared with conventional techniques, embodiments of the present disclosure have various advantages. Embodiments of the present disclosure acquire a routing path from a user to a server when the user logs in the server. The server also extracts routing characteristic information of a corresponding user from the routing path. A currently logged-in critical path may be obtained based on routing characteristic information of current login of a user, and the current critical path is compared with a critical path that is previously frequently logged in by a corresponding user based on server records. Thus, the server may be able to identify whether the current login of the user is a non-local login. This may be an auxiliary mechanism for user identity confirmation based on path reputation between a user machine and a login server. The mechanism allows the login server to identify whether the current login account is suspicious of theft and is capable of providing a relatively accurate risk control means. Meanwhile, embodiments of the present disclosure may obtain traffic information of a router between a user and a server, and may provide a true position of the user more carefully. Accordingly, the present disclosure may reduce influence of an IP address change on user risk identification, reduce the error rate of risk user identification, and identify geographic position more accurately.

This Summary is not intended to identify all key features or essential features of the claimed subject matter, nor is it intended to be used alone as an aid in determining the scope of the claimed subject matter.

BRIEF DESCRIPTION OF THE DRAWINGS

The Detailed Description is described with reference to the accompanying figures. The use of the same reference numbers in different figures indicates similar or identical items.

DETAILED DESCRIPTION

The present disclosure is further described below in detail with reference to the drawings and embodiments.

Embodiments of this present disclosure include acquiring a routing path from a user to a server when the user logs in the server, and extract routing characteristic information of a corresponding user from the routing path. A currently logged-in critical path may be obtained based on routing characteristic information of a current login of a user, and the current critical path is compared with a critical path that is previously frequently logged in by a corresponding user in server records to identify whether the current login of the user is non-local login.

Figure 1:
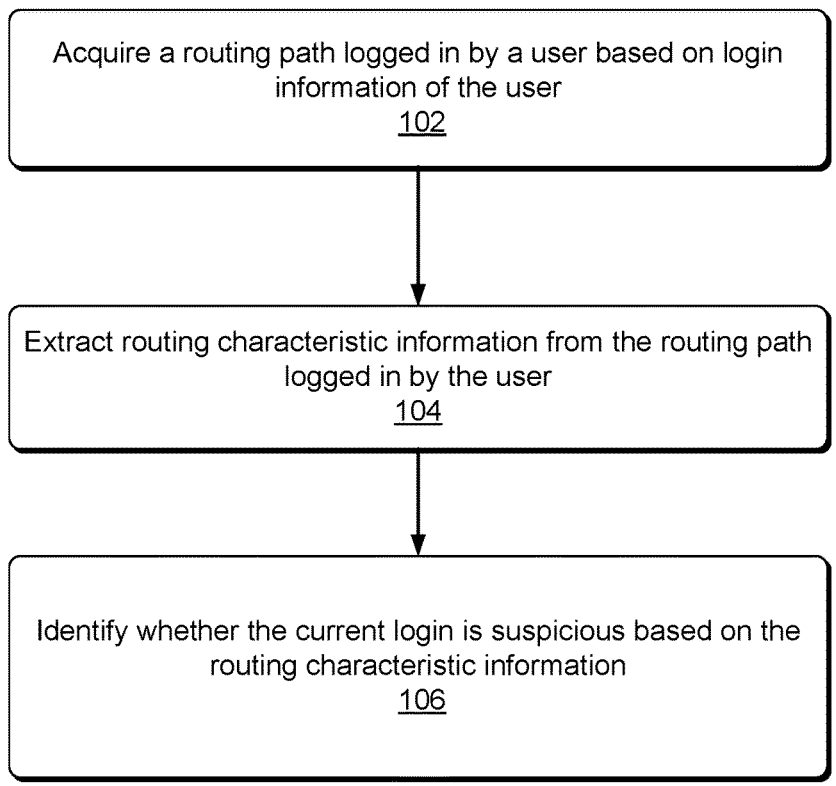
FIG. 1 is a flow chart of an illustrative process for determining credibility of online identities.

FIG. 1 is a flow chart of an illustrative process for determining credibility of online identities. At 102, a server may acquire a routing path logged in by a user based on login information of the user. In some embodiments, the login information of the user may include information of a client terminal where the user initiates a login request and information of a server which receives the login request. In some instances, a message may be transferred from a client terminal to a server via a multistage router, and a message channel connected by various stages of routers may form a routing path logged in by a user.

In some embodiments, the server may acquire the routing path by sending a routing discovery message to the client terminal by the server, receiving routing node information hop-by-hop by a router receiving the routing discovery message, and collecting the routing node information by the server to form a routing path that is currently logged in by the user.

In some embodiments, a path collection application program may be deployed at a server. When a login request that is submitted from a client terminal by a user is received, the path collection application program may be initiated and connected to a network to send an Internet Control Message Protocol (ICMP) routing discovery message to the client terminal. A router receiving the message may provide feedback routing node information hop-by-hop. The routing path that is currently logged in by the user may be formed immediately after the path collection application program collects the hop-by-hop routing node information.

In some embodiments, the server may acquire the routing path by sending a routing discovery message to the server by the client terminal, feeding back routing node information hop-by-hop by a router receiving the routing discovery message, and collecting the routing node information by the client terminal to form a routing path that is currently logged in by the user.

In some embodiments, a path collection application program may be deployed at a client terminal; when a user submits a login request, the path collection application program is initiated and connected to a network to send an ICMP routing discovery message to the server. A router receiving the message may provide feedback routing node information hop-by-hop. The routing path that is currently logged in by the user may be formed immediately after the path collection application program collects the hop-by-hop routing node information.

At 104, the server may extract routing characteristic information from the routing path logged in by the user. The server may extract the routing characteristic information by extracting information of a key router from the routing path logged in by the user, wherein the information of the key router is information of a router with traffic greater than a preset threshold, and organizing the information of the key router to form routing characteristic information.

At 106, the server may identify whether the current login is suspicious based on the routing characteristic information. In some embodiments, the server may identify by querying historical routing characteristic information corresponding to the user identity, and comparing whether the historical routing characteristic information and the current routing characteristic information are the same. If the historical routing characteristic information and the current routing characteristic information are not the same, the server may determine that the login is suspicious.

In some embodiments, the routing characteristic information of current login of a user may be compared with preceding historical routing characteristic information of a corresponding user to view whether a critical path therein is consistent with a critical path in trusted routing characteristic information that is frequently used by the user. If there is a critical path, the server may determine that no non-local login occurs and the login is not at risk. But if there is no critical path, the server may determine that non-local login occurs and the login is suspicious.

The trusted routing characteristic information may be generated by various ways. For example, the trusted routing characteristic information may include a routing path used when an account is registered, and a routing path certified by strong identity authentication. In these instances, the strong identity authentication may include answering of an authentication question, confirmation of a client via telephone communication, and so on.

There may be more than one routing path frequently used by a user. For example, the user may access the Internet at an office, at home, via a mobile phone, and etc. Accordingly, there may be multiple critical paths in the trusted routing characteristic information to ensure more reliable and user friendly.

In some embodiments, the login information of the user also may include a machine identity. In these instances, the server may identify whether the current login is suspicious based on the routing characteristic information by presetting a legal correspondence table of a machine identity and a user class, wherein the user class is a cluster of the user identity with the same path characteristic information. Then, the server may determine whether the user identity and the machine identity are present in the correspondence table of the machine identity and the user class. If the user identity and the machine identity are not present, the server may determine that the login is suspicious.

In some embodiments, a legal correspondence table of a machine identity and a user class (e.g., a group of the user identity with the same routing characteristic information) may be set at a server. When a login request of a user is received, identity of a login client terminal and/or identity of a login server (machine identity) and user identity of current login may be compared with the legal correspondence table of the machine identity and the user class. If the corresponding relationship between the machine identity and the user identity of the current login is present in the legal correspondence table, the server may determine that the user does not log in non-locally and therefore the login is not at risk. Otherwise, the server may determine that the user logs is non-locally and therefore is suspicious.

The process to build a network router is sometime complicated and also has relatively expensive. A common network operator may not easily change a critical routing path. Under conventional technologies, a network operator changes its own IP address pool, and especially IP address allocation among cities. Compared with the conventional technologies, the technologies in the present disclosure for determining whether an account is logged in non-locally based on a critical routing path may more accurately determine that a login is suspicious.

In addition, under the conventional technologies, a determination of an account login address via a user identity may be inaccurate among cities. For example, a third party using a stolen account may use a network proxy server in the same city that the legitimate user used to log in. In this instance, the conventional technologies may not detect that the account is logged in non-locally. But an auxiliary mechanism described in this disclosure confirms user identities based on path reputation between a user machine and a login server. This allows the login server to effectively identify whether the current login account is at risk (e.g., stolen), and therefore provides more accurate risk control.

In order to facilitate those skilled in the art to better understand the present disclosure, the present disclosure is further described using some embodiments below. In some embodiment, a user with a user identity (e.g., 2012) may send a login request to a server of a website A via a client terminal of the website A. The server of the website A may complete login of the user in response to the request and generate login information of the user based on Cookies returned by the client terminal of the website A.

The server of the website A may initiate a path collection application program to send an ICMP routing discovery message to a login server. The path collection application program may directly return hop-by-hop router information passed by the discovery message to the server after receiving the information. The hop-by-hop router information may be analyzed, and the user identity 2012 may be marked to acquire a routing path logged in by the user and to return the routing path to the server.

The server of the website A may analyze routing information of each routing node in the routing path logged in by the user to extract a router with a traffic reaching a traffic preset value as a key router. A critical path may be generated based on the key router and marked with the user identity 2012 to generate path characteristic information of current login of the user. Historical routing characteristic information of last login of 2012 may be extracted from records of the server of the website A, and comparison may be made whether a key router of the historical routing characteristic information is the same as that of the path characteristic information of the current login.

If multiple key routers are found to be different in the historical routing characteristic information and the path characteristic information of the current login of the user 2012, the server may determine that a corresponding account of the user 2012 is at the risk of non-local login.

It should be noted that, for simplicity, some embodiments are expressed as a combination of a series of actions, but those skilled in the art should know that the present disclosure is not limited by the described action sequence. Some steps may be performed in other sequences or simultaneously based on the present disclosure.

Figure 2:
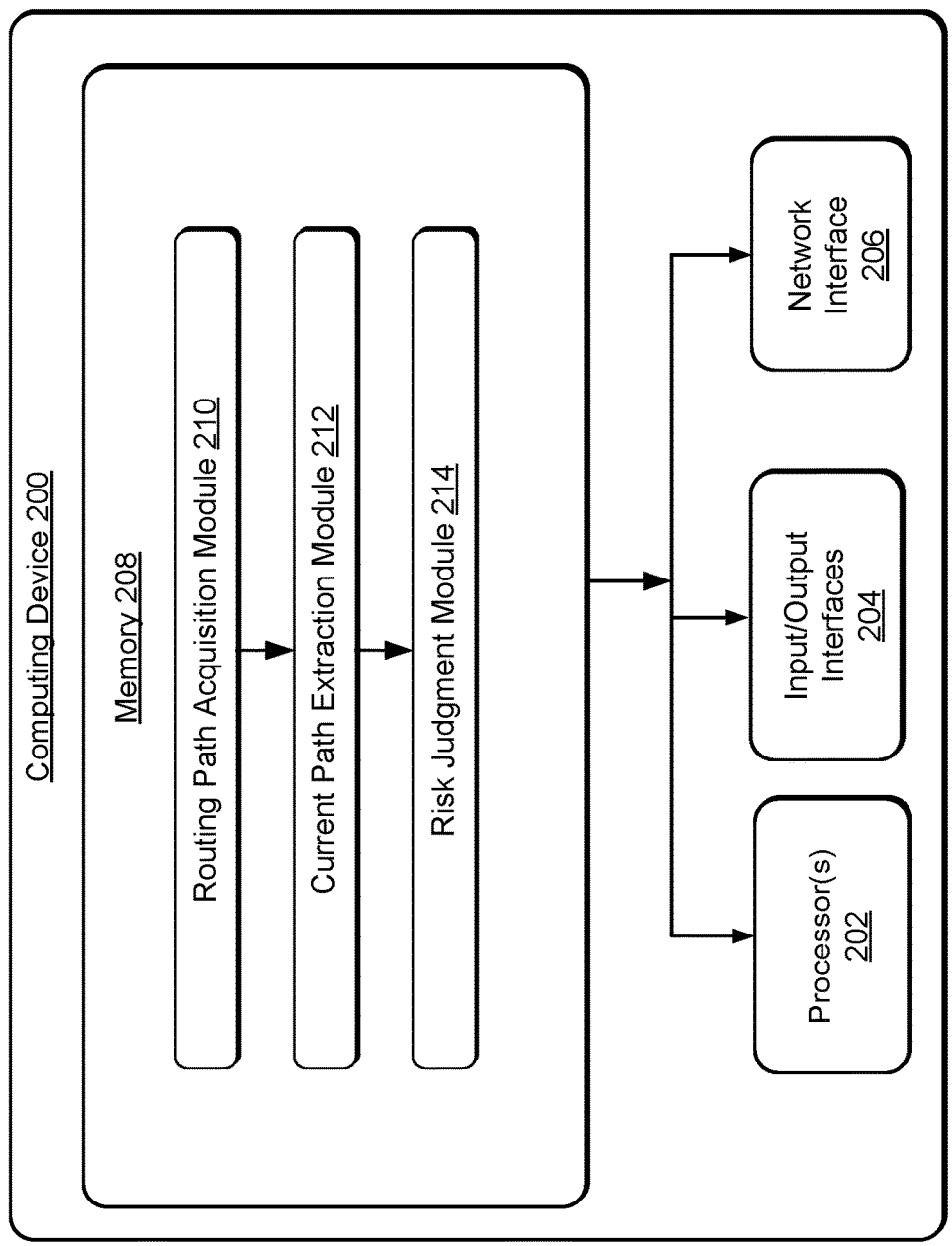
FIG. 2 is a schematic diagram of an illustrative computing architecture that enables user risk identification.

FIG. 2 is a schematic diagram of an illustrative computing architecture that enables user risk identification. The computing device 200 may be a user device or a server for a multiple location login control. In one exemplary configuration, the computing device 200 may include one or more processors 202, input/output interfaces 204, network interface 206, and memory 208.

The memory 208 may include computer-readable media in the form of volatile memory, such as random-access memory (RAM) and/or non-volatile memory, such as read only memory (ROM) or flash RAM. The memory 208 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 208 in more detail, the memory 208 may include a routing path acquisition module 210 configured to acquire a routing path logged in by a user based on login information of the user, a current path extraction module 212 configured to extract current routing characteristic information from the routing path logged in by the user, and a risk judgment module 214 configured to identify whether the current login is suspicious based on the current routing characteristic information.

In some embodiments, the login information of the user may include information of a client terminal where the user initiates a login request and information of a server which receives the login request. In some embodiments, information may be transferred from a client terminal to a server via a multistage router, and a message channel connected by various stages of routers may form a routing path logged in by a user.

In some embodiments, the routing path acquisition module 210 may include a routing discovery message sending sub-module at the server configured to send a routing discovery message to the client terminal, and a collection sub-module configured to collect routing node information fed back hop-by-hop by a router receiving the routing discovery message, and a path generation sub-module configured to generate a currently logged-in routing path corresponding to the user identity. These sub-modules may be located on the server.

In some embodiments, a path collection application program may be deployed at a server. When a login request that is submitted from a client terminal by a user is received, the path collection application program may be initiated and connected to a network to send an ICMP routing discovery message to the client terminal. A router receiving the message may provide feedback routing node information hop-by-hop. The routing path that is currently logged in by the user may be formed immediately after the path collection application program collects the hop-by-hop routing node information.

In some embodiments, the routing path acquisition module 210 may include a routing discovery message sending sub-module configured to send a routing discovery message to the server. The routing path acquisition module 210 may also include a collection sub-module configured to collect routing node information fed back hop-by-hop by a router receiving the routing discovery message, and a path generation sub-module configured to generate a currently logged-in routing path corresponding to the user identity. These sub-modules may be located in the client terminal.

In some embodiments, a path collection application program may be deployed at a client terminal; when a user submits a login request. The path collection application program may be initiated and connected to a network to send an ICMP routing discovery message to the server. A router receiving the message may provide feedback routing node information hop-by-hop. The routing path that may be currently logged in by the user may be formed immediately after the path collection application program collects the hop-by-hop routing node information.

In some embodiments, the current path extraction module 212 may include a user login routing path extraction sub-module configured to extract information of a key router from the routing path logged in by the user, wherein the information of the key router is information of a router with a traffic greater than a preset threshold, a key router information formation sub-module configured to organize the information of the key router to form current routing characteristic information, and a risk judgment module configured to identify whether the current login is suspicious based on the current routing characteristic information.

In some embodiments, the risk judgment module 214 may include a user identity query sub-module configured to query historical routing characteristic information corresponding to the user identity, and a routing characteristic information comparison module configured to compare whether the historical routing characteristic information and the current routing characteristic information are the same. If the historical routing characteristic information and the current routing characteristic information are not the same, the server may determine that the user login is suspicious.

In some embodiments, routing characteristic information of current login of a user may be compared with preceding historical routing characteristic information of a corresponding user to view whether a critical path therein is consistent with a critical path in a trusted routing characteristic information that is frequently used by the user. If a critical path therein is consistent with a critical path in a trusted routing characteristic information that is frequently used by the user, the server may determine that no non-local login occurs and the user is not at risk. Otherwise, the server may determine that non-local login occurs, and therefore the user login is suspicious.

The trusted routing characteristic information may be generated by various ways. In some embodiments, a routing path may be used when an account is registered, and a routing path may be certified by identity authentication. In these instances, the strong identity authentication may include answering of an authentication question, confirmation of a client via telephone communication, and so on.

There may be more than one routing path frequently used by a user (e.g., an office, home, mobile phone, and etc). Thus, there also may be multiple critical paths in the trusted routing characteristic information to ensure more reliable and humane judged results.

In some embodiments, the login information of the user may also include a machine identity; and the risk judgment module 214 may include a user identity clustering sub-module configured to preset a legal correspondence table of a machine identity and a user class, wherein the user class is a cluster of the user identity with the same path characteristic information, and a user identity and machine identity judgment sub-module configured to determine whether the user identity and the machine identity are present in the legal correspondence table of the machine identity and the user class. If the user identity and the machine identity are not present, the server may determine that the user login is suspicious.

In some embodiments, an authorized correspondence table of a machine identity and a user class (e.g., a cluster of the user identity with the same routing characteristic information) may be set at a server. When a login request of a user is received, identity of a login client terminal and/or identity of a login server (e.g., machine identity) and a user identity of a current login may be compared with the authorized correspondence table of the machine identity and the user class. If the corresponding relation between the machine identity and the user identity of the current login is present in the legal correspondence table of the machine identity and the user class, the server may determine that the user does not log in non-locally and is not suspicious. Otherwise, the user is considered to log in non-locally, and thus the login is suspicious.

Reference may be made to relevant descriptions of the above-described embodiments; details are not repeated herein. Those skilled in the art should understand that the embodiments of the present disclosure may be provided as a method, a system or a computer program product. Accordingly, the present disclosure may employ an entirely hardware embodiment, an entirely software embodiment, or a form of an embodiment combining software and hardware aspects. Moreover, the present disclosure may be a form of a computer program product implemented on one or more computer available storage media (including but not limited to a disk memory, a CD-ROM, an optical memory, etc.) which comprise computer available program codes.

The present disclosure is described with reference to a flow chart and/or a block diagram of a method, an apparatus (system) and a computer program product based on an embodiment of the present disclosure. It should be understood that each process and/or box in a flow chart and/or a block diagram and a combination of processes and/or boxes in a flow chart and/or a block diagram may be realized by computer program instructions. These computer program instructions may be provided to a processor of a general-purpose computer, a special-purpose computer, an embedded processor or other programmable data processing equipment to produce a machine such that the instructions executed by a processor of a computer or other programmable data processing equipment may produce a device for realizing functions designated in one or more processes in a flow chart and/or one or more boxes in a block diagram.

These computer program instructions also may be stored in a computer-readable memory that may guide a computer or other programmable data processing equipment to work in an ad hoc fashion such that the instructions stored in the computer-readable memory may produce a manufactured product including an instruction device, wherein the instruction device may realize functions designated in one or more processes in a flow chart and/or one or more boxes in a block diagram.

These computer program instructions also may be loaded onto a computer or other programmable data processing equipment such that a series of operation steps may be executed on a computer or other programmable equipment to produce processing realized by a computer, thereby the instructions executed on a computer or other programmable equipment may provide steps for realizing functions designated in one or more processes in a flow chart and/or one or more boxes in a block diagram.

Although the embodiments of the present disclosure have been described, once those skilled in the art know the basic creative concept, additional variations and modifications may be made to these embodiments. Accordingly, the appended claims are intended to be construed as including the embodiments as well as all variations and modifications that fall within the scope of the present disclosure.

A detailed introduction has been made above to methods and devices for identifying risk of a user login as provided by the present disclosure. Examples are applied herein to explain the principles and embodiments of the present disclosure, and the description of the above embodiments is only used for the purpose of assisting in understanding the method of the present disclosure and its core ideas; meanwhile, those of ordinary skill in the art may make changes in terms of particular embodiments and application scopes based on the ideas of the present disclosure. In summary, the contents of the specification shall not be interpreted as limiting the present disclosure.

The embodiments are merely for illustrating the present disclosure and are not intended to limit the scope of the present disclosure. It should be understood for persons in the technical field that certain modifications and improvements may be made and should be considered under the protection of the present disclosure without departing from the principles of the present disclosure.

What is claimed is:
1. A method comprising:
receiving, by a server, current login information associated with a user identity that is sent from a client terminal;
acquiring a current routing path between the client terminal and the server based on the current login information associated with the user identity;

extracting routing characteristic information of the current routing path, extracting the routing characteristic information of the current routing path comprising extracting information of one or more key routers having an amount of traffic greater than a preset threshold from the current routing path; and determining a risk of a current login associated with the user identity by:

comparing historical routing characteristic information of one or more routing paths that is obtained in one or more previous logins associated with the user identity with the extracted routing characteristic information of the current routing path in the current login, the historical routing characteristic information including trusted routing characteristic information that includes at least information of a routing path used when an account associated with the user identity is registered and a routing path certified by an identity authentication.

2. The method of claim 1, wherein the current login information associated with the user identity includes information of the client terminal from which a login request is initiated, and information of the server.

3. The method of claim 2, wherein acquiring the current routing path includes:

sending, by the server, a routing discovery message to the client terminal, determining routing node information using hop-by-hop routing corresponding to the routing discovery message, and generating the current routing path based on the routing node information.

4. The method of claim 3, wherein acquiring the current routing path further includes receiving, by the server, the routing discovery message from the client terminal.

5. The method of claim 1, wherein extracting the routing characteristic information of the current routing path further includes generating the routing characteristic information of the current routing path based on the information of the one or more key routers.

6. The method of claim 1, further comprising identifying the current login as suspicious in response to determining that the historical routing characteristic information is different than the extracted routing characteristic information.

7. A method comprising:

receiving, by a server, current login information associated with a user identity;

acquiring a current routing path based on the current login information associated with the user identity;

generating routing characteristic information of the current routing path; and determining a risk of a current login associated with the user identity by comparing the generated routing characteristic information of the current routing path in the current login with historical routing characteristic information including one or more previous routing paths for one or more previous logins associated with the user identity, the historical routing characteristic information including trusted routing characteristic information that includes at least information of a routing path used when an account associated with the user identity is registered and a routing path certified by an identity authentication.

8. The method of claim 7, wherein the current login information of the user identity includes information of a client terminal from which a login request is initiated, and information of the server associated with the system, and wherein the method further comprises:

sending a routing discovery message to the client terminal;

determining routing node information using hop-by-hop routing corresponding to the routing discovery message; and generating the current routing path based further on the routing node information.

9. The method of claim 8, further comprising receiving the routing discovery message from the client terminal.

10. The system of claim 7, further comprising retrieving the historical routing characteristic information.

11. One or more non-transitory media storing computer-executable instructions that, when executed by one or more processors of a server, instruct the one or more processors to perform acts comprising:

receiving current login information associated with a user identity from a client terminal;

acquiring a current routing path between the client terminal and the server based on the current login information associated with the user identity;

extracting, from the current routing path, information of one or more key routers from the current routing path as routing characteristic information of the current routing path between the client terminal and the server; and determining a risk of a current login associated with the user identity by comparing historical routing characteristic information of one or more routing paths that is obtained in one or more previous logins associated with the user identity with the routing characteristic information of the current routing path in the current login, the historical routing characteristic information including trusted routing characteristic information that includes information of at least one of a routing path used when an account associated with the user identity is registered or a routing path certified by an identity authentication.

12. The one or more non-transitory media of claim 11, wherein the current login information of the user identity includes information of the client terminal which a login request is initiated, and information of the server, and wherein acquiring the current routing path includes:

sending, by the server, a routing discovery message to the client terminal, and generating the current routing path based on the routing node information.

13. The one or more non-transitory media of claim 12, wherein the routing discovery message is an Internet Control Message Protocol (ICMP) discovery message.

14. The one or more non-transitory media of claim 11, wherein determining the risk further includes determining a degree of risk by comparing routing node information of the current routing path and particular routing node information that is recorded within a predetermined time period.

15. The non-transitory media of claim 11, the acts further comprising identifying the current login as suspicious when the historical routing characteristic information is different than the routing characteristic information of the current routing path.

* * * * *